(12) United States Patent
Mohan et al.

(10) Patent No.: US 12,142,269 B2
(45) Date of Patent: Nov. 12, 2024

(54) INVOKABLE AUTOMATED AGENT FOR INTERACTIVE WORKFLOWS

(71) Applicant: ServiceNow, Inc., Santa Clara, CA (US)

(72) Inventors: Vinay Mohan, Fremont, CA (US); Scott Michael Rhodes, Torrance, CA (US); Ravi Ambati, Dublin, CA (US); Daniel Li-Shuan Wu, San Diego, CA (US); Kristopfer P. Krueger, Escondido, CA (US); Gaurav Goyal, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 357 days.

(21) Appl. No.: 17/379,251

(22) Filed: Jul. 19, 2021

(65) Prior Publication Data

US 2023/0018601 A1 Jan. 19, 2023

(51) Int. Cl.
*G10L 15/22* (2006.01)
*H04L 51/02* (2022.01)

(52) U.S. Cl.
CPC .............. *G10L 15/22* (2013.01); *H04L 51/02* (2013.01)

(58) Field of Classification Search
USPC ................. 704/246, 247, 251, 252, 270–275
See application file for complete search history.

(56) References Cited

U.S. PATENT DOCUMENTS

| | | | | |
|---|---|---|---|---|
| 10,757,258 | B1* | 8/2020 | Hardebeck | .......... H04L 65/1076 |
| 2002/0145628 | A1* | 10/2002 | Burgin | ..................... G06F 9/453 |
| | | | | 715/760 |
| 2002/0146668 | A1* | 10/2002 | Burgin | .................. G06F 16/954 |
| | | | | 434/118 |
| 2010/0076843 | A1* | 3/2010 | Ashton | .................. G06Q 30/06 |
| | | | | 705/26.1 |
| 2010/0324941 | A1* | 12/2010 | Stevenson | ............... G06N 3/006 |
| | | | | 705/26.1 |
| 2014/0314225 | A1* | 10/2014 | Riahi | ...................... H04L 51/02 |
| | | | | 379/265.09 |
| 2022/0400091 | A1* | 12/2022 | Wyss | ................... H04L 65/1069 |

* cited by examiner

*Primary Examiner* — Leonard Saint-Cyr
(74) *Attorney, Agent, or Firm* — Van Pelt, Yi & James LLP

(57) ABSTRACT

An indication from a live agent in a communication session with a user to invoke a specified automated agent interactive conversation flow is received. The communication session with the user is transitioned from the live agent to the specified automated agent interactive conversation flow. During the specified automated agent interactive conversation flow, the live agent retains control over the communication session. An indication of an interaction of the user with the specified automated agent interactive conversation flow is provided. The communication session with the user is returned back to the live agent.

20 Claims, 11 Drawing Sheets

INVOKABLE AUTOMATED AGENT FOR INTERACTIVE WORKFLOWS

BACKGROUND OF THE INVENTION

Chat agent software allows a user to interact with an agent in real time. Using a chat agent, a user, such as a customer or employee, can share information with an agent by sending messages back and forth. Typically, a chat starts with a request to initiate a chat conversation. The request is queued and then routed to different agents based on factors such as availability, queue length, and expertise. While chat conversations can consist primarily of text-based messages sent back-and-forth, rich chat messages and chat interactions are also possible. For example, a rich chat user interface can allow a chat user to share media such as photos and live video, provide a time and date by selecting an available appointment time from a chat calendaring user interface dialog, and choose from a chat menu of multiple provided options for narrowing down a decision, among others. When applied to a specific context, a chat agent can be used to process a dedicated workflow. For example, workflows that can be accomplished via a chat conversation include making a dinner reservation, reserving a conference room, submitting an incident ticket, and responding to a request for information about an employee policy.

BRIEF DESCRIPTION OF THE DRAWINGS

Various embodiments of the invention are disclosed in the following detailed description and the accompanying drawings.

DETAILED DESCRIPTION

Figure 1:
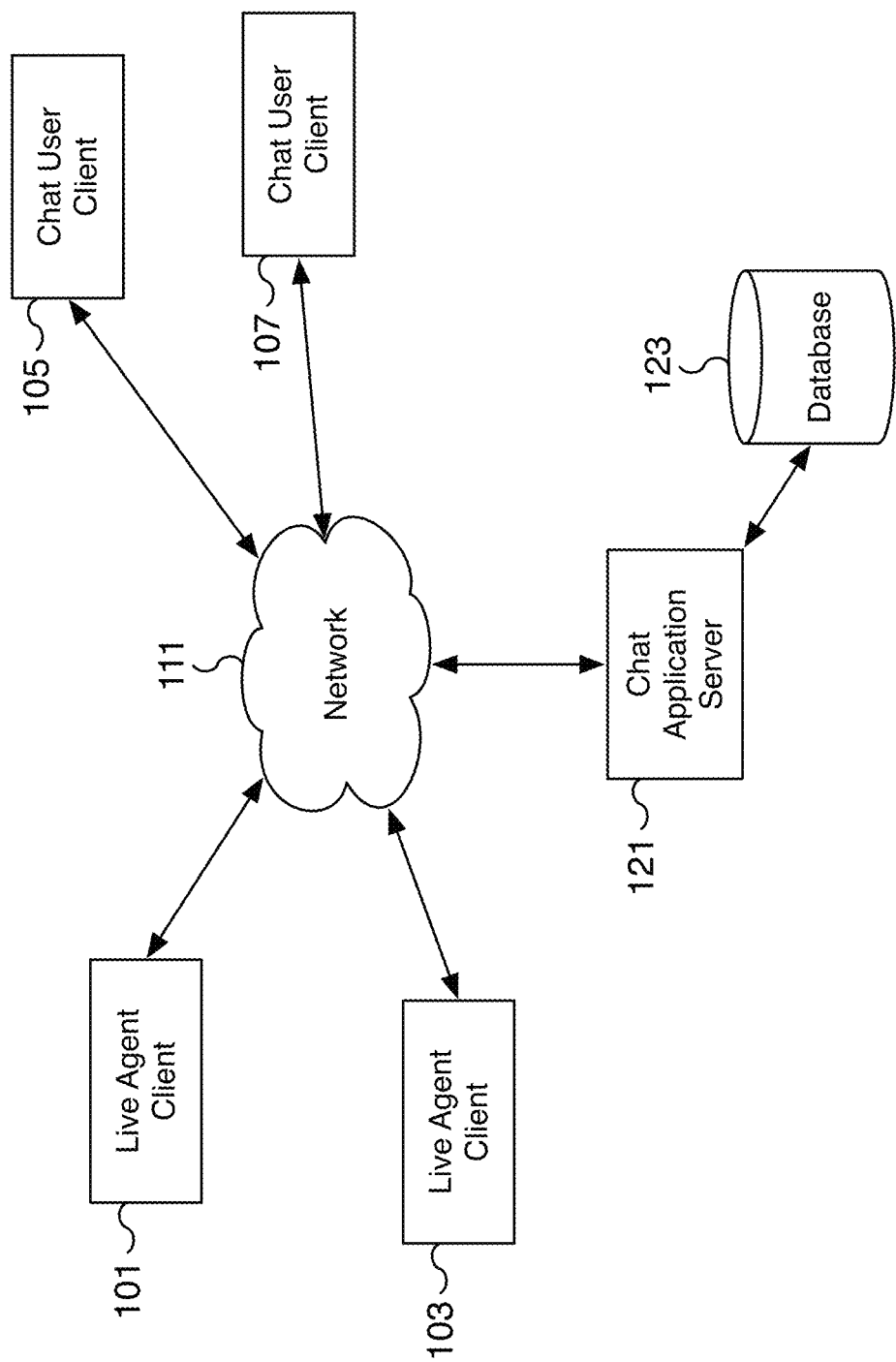
FIG. 1 is a block diagram illustrating an example of a network environment for a chat agent platform with invokable automated agents for performing interactive workflows.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A chat agent platform for invoking automated agents to perform interactive workflows is disclosed. The disclosed chat agent platform and related techniques allow a live agent to specify and invoke an automated agent to perform a specified automation workflow. The specified automation workflow is carried out by the automated agent, such as a virtual agent or chatbot, as an interactive conversation with a chat user. For example, a live agent can invoke automation workflows to automate tasks with a chat user such as making a reservation, cancelling an appointment, searching for and retrieving corporate policies requested by a chat user, and resetting a user's password, among others. In various embodiments, once an interactive conversation workflow with an automated agent is invoked, the automated agent takes over the conversation with the chat user from the live agent. The live agent may continue to participate in the chat session by monitoring the conversation and, in some instances, may provide guidance to the automated agent as needed or as appropriate.

In some embodiments, a set of available automated agent workflows is presented to a live agent based on the context of a chat conversation with a user. A workflow can be selected by the live agent from the available choices and invoked with one or more initial parameters or arguments, for example, to customize the automated workflow for the context of a particular chat user. In some embodiments, the context of the conversation may be utilized to initialize parameters for the invoked workflow. Once an automated workflow is initialized, the automated agent performs as a virtual agent to provide information to and/or to gather information from the chat user. Depending on the context, the automated agent can also utilize different chat user interface messaging components such as a date selector to provide the chat user with a rich user interface to share information. As another example, the automated agent can provide a menu of options from which the chat user can select from to complete a response to a question. The various provided responses from the chat user are captured by the chat agent platform and provided to the live agent as appropriate. In some embodiments, the user responses are hidden from the live agent, for example, to increase the level of privacy and/or security of the system for the chat user. For example, sensitive information such as a chat user's personal information can be collected from the chat user via the automated agent without exposing the sensitive information to the live agent. In some embodiments, a message with sensitive information can be hidden or masked completely from a live agent or sensitive fields in a message can be hidden or masked from the live agent. In various embodiments, once the automated agent completes the selected workflow, the chat session with the chat user returns back to a chat session between the live agent and the chat user. If appropriate, the live agent can later invoke a different automated agent workflow, for example, to resolve a different request by the user.

In some embodiments, an indication from a live agent in a communication session with a user to invoke a specified automated agent interactive conversation flow is received. For example, a live agent can select from available automated agent interactive workflows based on the context of a communication session with a user. For example, the user can express a desire to make a reservation for an appointment. Based on the context, an automated agent interactive workflow for scheduling an appointment is made available for the live agent to select and invoke.

In some embodiments, once a specified automated agent interactive conversation flow is invoked, the communication session with the user is transitioned from the live agent to the automated agent interactive conversation flow. For example, a virtual agent running the corresponding selected automated interactive workflow takes over the communication session with the user and the live agent can be transitioned to be a passive observer of the communication session. In various embodiments, the live agent retains control over the communication session during the automated agent interactive conversation flow. For example, the live agent can observe and/or override the automated agent interactive conversation flow including by overriding automated requests and/or responses. As another example, the live agent can provide input parameters for guiding the automated agent workflow and/or for canceling the automated workflow entirely.

In some embodiments, an indication of an interaction of the user with the automated agent interactive conversation flow is provided. For example, once the automated agent interactive conversation flow is initiated, the live agent is provided with an automated agent interactive conversation flow user interface. The automated agent interactive conversation flow user interface can be used to monitor the automated conversation flow including to receive information responses provided by the user in response to requests by the automated agent. As an example, the automated agent can request that the user select an appointment time from available open time slots to make a reservation. A selected appointment time provided by the chat user via the chat conversation and the corresponding interaction of the communication session between the chat user and the automated agent is provided to the live agent.

In some embodiments, the communication session with the user is returned back to the live agent. For example, once the automated agent interactive conversation flow has finished (or is terminated by the live agent), the communication session with the user is transitioned from the automated agent back to the live agent. For example, an automated agent interactive conversation flow for making a reservation is complete and ends once an appointment is made and confirmed with the user. On completion of the automated conversation flow, the chat conversation between the automated agent and the chat user reverts back to a communication session between the live agent and the chat user. The live agent is now available to respond to additional requests from the user and depending on the context of the conversation, the live agent can invoke a different automated agent interactive conversation flow as appropriate.

FIG. 1 is a block diagram illustrating an example of a network environment for a chat agent platform with invokable automated agents for performing interactive workflows. In the example shown, live agent clients 101 and 103 represent multiple live agents from a pool of live agents and chat user clients 105 and 107 represent multiple chat users from a pool of potential chat users. The live agents and chat users can interact via a chat agent application running as a service on chat application server 121. When appropriate, a live agent can invoke an automated agent running on chat application server 121 to perform an automated workflow over an interactive chat session. In various embodiments, live agent clients 101 and 103 and chat user clients 105 and 107 access services of chat application server 121 via network 111 including services for managing and/or participating in chat sessions with live and automated agents. Network 111 can be a public or private network. In some embodiments, network 111 is a public network such as the Internet. In various embodiments, chat application server 121 provides configuration management database (CMDB) services including chat-based services that utilize a CMDB.

In some embodiments, live agent clients 101 and 103 and chat user clients 105 and 107 are example client systems used to connect to chat agent services offered by chat application server 121. Both live agent clients 101 and 103 and chat user clients 105 and 107 may have different software/hardware configurations and can include laptops, desktop computers, mobile devices, tablets, kiosks, smart televisions, or other appropriate computing devices. In some embodiments, live agent clients 101 and 103 are used to configure, monitor, and operate a chat agent application service including the invokable automated workflows of the chat service. Chat user clients 105 and 107 are used to participate as chat users in the chat agent application service of chat application server 121. For example, chat user clients 105 and 107 can each establish a chat session with a corresponding live agent such as a live agent associated with either live agent client 101 or 103. During the course of a chat session, one or more automated virtual agents running on chat application server 121 can be invoked to direct a conversation flow with the chat user as part of an automated workflow. The ability to invoke and run an automated workflow significantly improves the efficiency and productivity of the chat session for both chat users and live agents. For example, an automated workflow executed using a virtual agent can reduce the number of potential errors that would otherwise have been introduced in the event the workflow was performed manually by a live agent. The automated workflows can also provide a consistent user experience to chat users while allowing a live agent to intercede as necessary. In some embodiments, the automated workflow also allows a live agent to operate a higher number of chat sessions with different chat users concurrently by delegating certain tasks to an automated virtual agent.

In various embodiments, chat application server 121 utilizes database 123 to provide certain chat agent services. For example, database 123 can be a configuration management database (CMDB) used by chat application server 121 for providing CMDB services including chat-based CMDB-based services. In some embodiments, database 123 is utilized by chat application server 121 to store information relevant to clients such as live agent clients 101 and 103 and chat user clients 105 and 107. Example client data can include invokable automated workflows as well as data related to chat users. For example, database 123 can be used to store resource discovery information as part of a CMDB service for managing client resources. The stored resource discovery information can be accessible via a chat service of chat application server 121. Although database 123 is shown connected to chat application server 121, database 123 may be located in a variety of network locations as appropriate. For example, database 123 may be located external to a local network that includes live agent clients 101 and 103 and/or chat user clients 105 and 107. In some embodiments, database 123 is not directly connected to chat application server 121 but only communicatively connected to chat application server 121. In some embodiments, database 123 is a cloud-based database server and may be part of and/or collocated with chat application server 121.

Although single instances of some components have been shown to simplify the diagram of FIG. 1, additional instances of any of the components shown in FIG. 1 may also exist. For example, chat application server 121 may include one or more different servers and/or multiple distributed components. Similarly, database 123 may include one or more database servers and may not be directly connected to chat application server 121. For example, database 123 and its components may be replicated and/or distributed across multiple servers, components, and/or locations. In some embodiments, live agent clients 101 and 103 and chat user clients 105 and 107 are just a few examples of potential clients to chat application server 121. Fewer or more clients can connect to chat application server 121. In some embodiments, components not shown in FIG. 1 may also exist.

Figure 2:
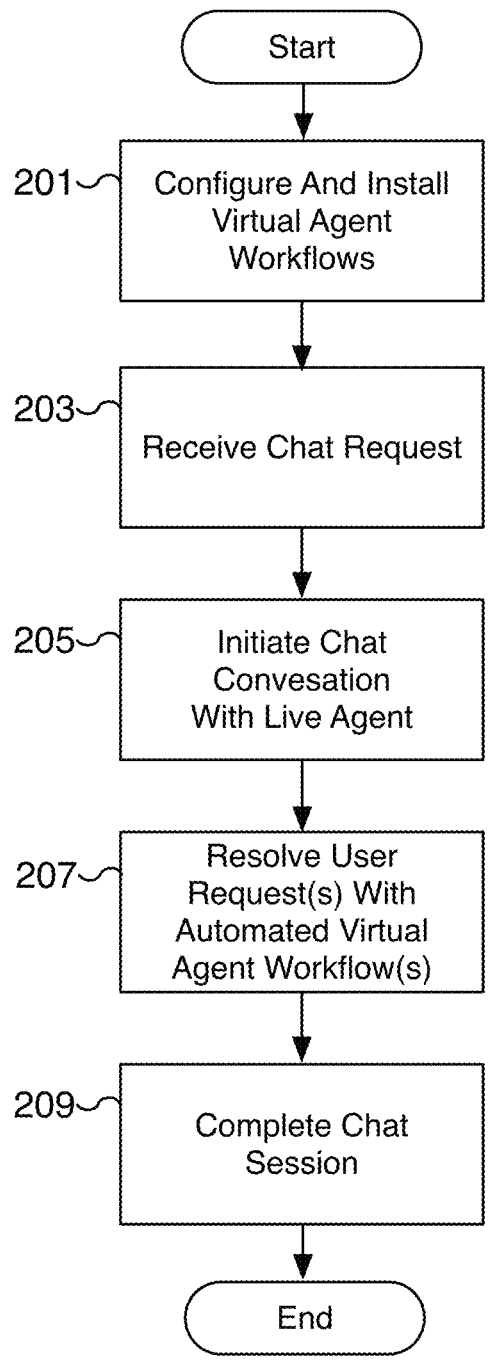
FIG. 2 is a flow chart illustrating an embodiment of a process for utilizing an automated agent for performing interactive workflows during a chat session.

FIG. 2 is a flow chart illustrating an embodiment of a process for utilizing an automated agent for performing interactive workflows during a chat session. Using the process of FIG. 2, a live agent can hand off a chat session to a virtual agent to perform an automated workflow. The workflow can follow an interactive conversation flow, where the virtual agent can send and receive messages to and from the chat user. Example workflows include filing an incident ticket, booking travel arrangements, and updating account information, among others. In some embodiments, the process of FIG. 2 is performed via a chat agent service running on chat application server 121 of FIG. 1. In some embodiments, the functionality of FIG. 2 can be monitored and/or managed from a chat agent user interface tool accessible to a live agent and/or chat agent administrator. In some embodiments, the chat session conducted using the process of FIG. 2 is between a live agent of live agent client 101 or 103 of FIG. 1 and a chat user of chat user client 105 or 107 of FIG. 1. In some embodiments, the relevant data of the chat agent service is stored in a database such as database 123 of FIG. 1.

At 201, virtual agent workflows are configured and installed. For example, one or more automated workflows are configured as conversation flows and installed. Each workflow can be designed to automate a task such as resetting a user's password, booking travel arrangements, or completing Human Resource documents, among others. The workflows can include multiple steps and require an interactive back-and-forth to gather information from a user. In various embodiments, the workflows can access and update customer data such as configuration management database (CMDB) data for tracking and managing customer data. For example, workflow steps can access and modify database records for tracking and resolving user issues. In some embodiments, the workflows are part of a larger cloud-based service platform that allows customers to manage and optimize business processes.

At 203, a chat request is received. For example, a user requests to participate in a chat session. In some embodiments, the request is initiated by a chat user such as a customer or employee. The request can be initiated from a user client device such as a mobile device, laptop, desktop, kiosk, or another network device. The client interface to the chat session can be implemented via a web browser, a dedicated chat application, a chat-enabled application or service, or another appropriate chat client. In some embodiments, the chat request is initiated by a live agent or automated by the chat service platform on behalf of a live agent or scheduled process. For example, a pre-scheduled chat session may be initiated by the chat service platform when a new user logs into a cloud-based service platform with the intention to welcome the user and to help walk the user through the steps required to change the new user's password.

In some embodiments, once the chat request is initiated, the request may enter a queue until the appropriate live agent and/or chat user is available. For example, a chat user queue may be used until a live agent is available to respond to the chat user's chat request. In some embodiments, a chat user queue is utilized as part of a process for assigning a live agent to the request. The assignment may include determining which of the available live agents are most qualified to address the chat user's request. For example, user's may be matched to an appropriate live agent pool based on properties and preferences such as client device capabilities, language preference, geographic region, user profile, etc.

At 205, a chat conversation is initiated with a live agent. For example, a chat session between a live agent and chat user is started. In some embodiments, the live agent is assigned from a pool of live agents and the chat user is removed from a queue of waiting chat users. In various embodiments, the chat session is initiated only when both users are available. The initiated chat conversation typically includes a series of back-and-forth messages between the chat user and live agent. For example, a chat user may query the live agent with messages to address one or more issues the chat user would like to resolve. Depending on the context, the live agent may find that an automated workflow will best address the user's request.

At 207, one or more user requests are resolved by invoking one or more automated virtual agent workflows. For example, based on the context of the chat conversation between the chat user and live agent, a virtual agent can be invoked to carry out an automated workflow. The workflow can include multiple steps including multiple back-and-forth messages to query additional information from the chat user. In some embodiments, the automated agent carries out the specified workflow but can also respond to direction provided by the live agent for directing the progress of the workflow. For example, one or more steps of the workflow can be skipped or refined using input from the live agent while the automated workflow is in progress. In various embodiments, the workflow can update a backend datastore such as a configuration management database (CMDB) and/or invoke or schedule additional actions, such as ordering a replacement hardware part as part of an IT hardware incident workflow. In various embodiments, multiple workflows can be invoked for a single chat session. For example, once a first workflow completes, the live agent returns back to the chat session and continues the conversation with the chat user. In the event a second workflow is appropriate, the live agent can initiate another specified workflow to address a second issue. In this manner, multiple workflows can be invoked sequentially during the same chat session. In some embodiments, a live agent may participate in multiple chat sessions concurrently with different chat users. The ability to delegate a task for a particular chat session with a first chat user to a virtual agent allows the live agent to focus on another chat session with a different chat user while the virtual agent performs the automated workflow with the first chat user.

At 209, the chat session is completed. For example, the live agent and chat user may agree to end the chat session or one of the parties will end the chat session without the consent of the other. At the completion of the chat session by any of the parties, a network error, or for any other reason, one or more completion tasks are executed. For example, a chat transcript may be logged and can be shared with the chat user, the live agent, a supervisor, a quality assurance team, or another appropriate reviewer. In some embodiments, analytics are performed on the chat session including, as examples, tracking the length of the session, the number of back-and-forth messages required to address the issues, the response time of messages, and the amount of time a chat user spent in a wait queue, etc. Additionally, open issues can be logged, and the invoked workflows can be analyzed, for example, by scoring or reviewing a workflow's performance. In some embodiments, an interactive chat session with a live agent can be saved and utilized as the starting basis for an automated interactive workflow. For example, a new interactive workflow can be created using the workflow manually implemented by a live agent.

Figure 3:
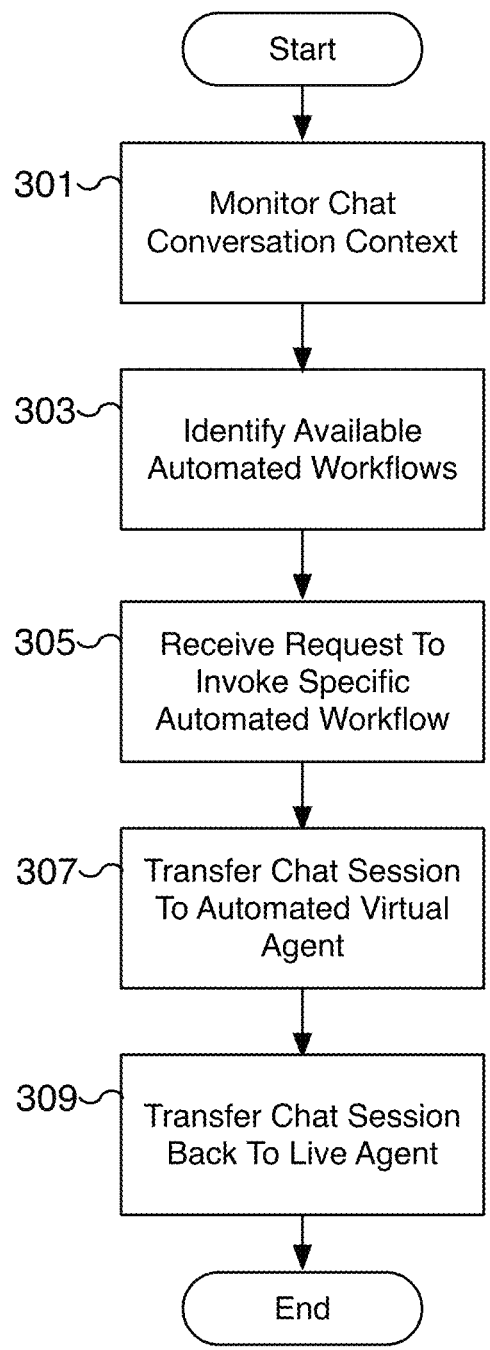
FIG. 3 is a flow chart illustrating an embodiment of a process for applying an interactive workflow using an automated agent during a chat session.

FIG. 3 is a flow chart illustrating an embodiment of a process for applying an interactive workflow using an automated agent during a chat session. Using the process of FIG. 3, a live agent can invoke a specified interactive workflow to be performed by an automated agent. The automated agent can carry out the workflow by directing the conversation flow with the chat user. In various embodiments, the process of FIG. 3 can be performed multiple times during a single chat session with a chat user to invoke multiple automated workflows. In some embodiments, the process of FIG. 3 is performed at 205 and/or 207 of FIG. 2 by a chat agent service such as a chat agent service running on chat application server 121 of FIG. 1. In some embodiments, the chat session associated with the process of FIG. 3 is a communication session between a live agent of live agent client 101 or 103 of FIG. 1 and a chat user of chat user client 105 or 107 of FIG. 1. In some embodiments, the relevant data of the chat agent service is stored in a database such as database 123 of FIG. 1.

At 301, the chat conversation is monitored for context. For example, the chat conversation between a live agent and chat user is monitored for context to help determine parameters for initializing an automated workflow. In some embodiments, the conversation is monitored automatically and text from the conversation is identified and used to set context variables. For example, the user may include the words "password" or "security" as part of a message, which can in turn enable a "user security settings" context variable.

In some embodiments, the context variables are set with the help of the live agent. For example, a live agent can mark selective text from messages and/or manually enter properties for context variables.

At 303, available automated workflows are identified. For example, a list of available workflows is identified and provided to the live agent. The list of available workflows can be based on the context and context variables identified at 301. In some embodiments, a graphical display of a list of available automated workflows can be invoked and displayed to the live agent in the live agent's chat user interface.

At 305, a request to invoke a specific automated workflow is received. For example, the live agent can invoke a specific automated workflow by selecting a workflow from a menu of available workflows in a live agent chat user interface. The request for a specific workflow to invoke is received by the chat agent service. In some embodiments, the request includes arguments for initializing the automated workflow including the name of the specific workflow to invoke. Additional parameters can be passed to the workflow to customize its behavior. For example, a request to invoke a workflow for scheduling an appointment can include the time zone to display available appointment time slots.

At 307, the chat session is transferred to an automated virtual agent. For example, the chat session is transferred over to an automated virtual agent from the live agent. The virtual agent then interacts with the chat user in place of the live agent. In various embodiments, the live agent maintains control of the chat session. For example, the live agent can monitor the messages of the conversation, provide guidance to the virtual agent, can interject with messages, and can end the automated workflow. Although the live agent maintains control of the chat session, the virtual agent can initiate and respond to messages with the chat user to implement the steps of the workflow. For example, the virtual agent can send rich messages that include graphical user interfaces for selecting an appointment time to the chat user. The virtual agent can also confirm and book an appointment based on the response received from the chat user. In some embodiments, the chat user can be informed, for example, via the chat agent client, that a virtual agent is joining the chat conversation.

At 309, the chat session is transferred back to the live agent. Once the automated workflow performed by the virtual agent is complete, or the live agent cancels the automated workflow, the chat session is transferred back to the live agent from the virtual agent. Once the chat session is transferred back to the live agent, the live agent interacts with the chat user and the virtual agent is no longer a part of the chat conversation. In some embodiments, the chat user can be informed via the chat agent client whether the party on the other end is a live agent or a virtual agent.

Figure 4:
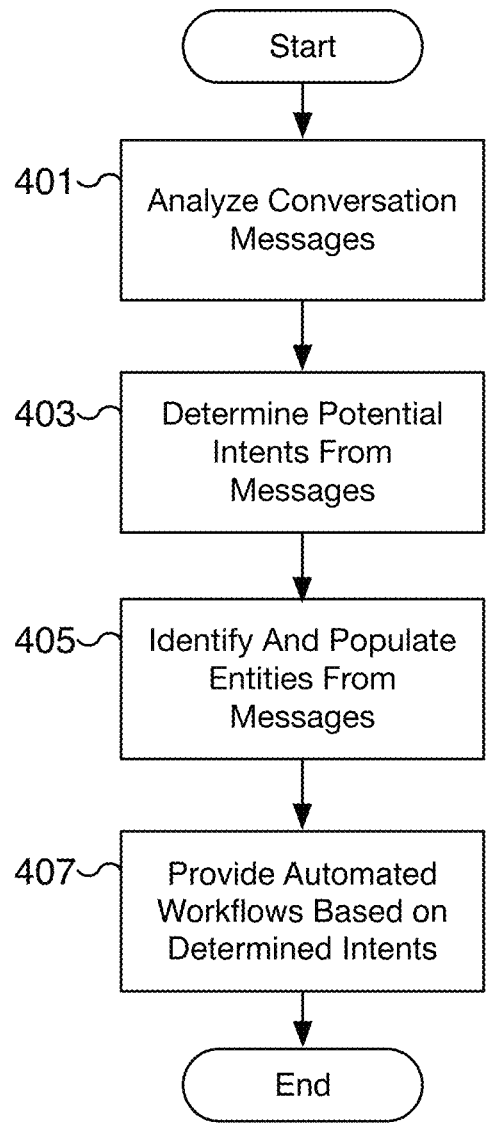
FIG. 4 is a flow chart illustrating an embodiment of a process for identifying relevant automated agent interactive workflows to apply during a chat session.

FIG. 4 is a flow chart illustrating an embodiment of a process for identifying relevant automated agent interactive workflows to apply during a chat session. Using the process of FIG. 4, a live agent is presented with available workflows that can be invoked and performed by an automated agent. In some embodiments, the process of FIG. 4 is performed at 301 and/or 303 of FIG. 3 by a chat agent service such as a chat agent service running on chat application server 121 of FIG. 1. In some embodiments, the chat session associated with the process of FIG. 4 is a communication session between a live agent of live agent client 101 or 103 of FIG. 1 and a chat user of chat user client 105 or 107 of FIG. 1. In some embodiments, the relevant data of the chat agent service is stored in a database such as database 123 of FIG. 1.

At 401, conversation messages are analyzed. For example, messages sent by the chat user and/or live agent are analyzed to determine context. In some embodiments, the analysis is performed by using a Natural Language Understanding (NLU) model. For example, a response message sent by the chat user is analyzed to identify the context and intent (or topic) of the message. Additionally, the message can be analyzed to determine object values from words or phrases of the message. For example, the message "Change my checking account address" can identify a "checking account" as an object value and set a corresponding context variable to the user's checking account. In various embodiments, multiple messages including messages originating from the virtual agent are analyzed and used to identify context. In some embodiments, the analysis is an ongoing process and the context is refined as the conversation progresses and more messages are shared.

At 403, potential intents from messages are determined. For example, once enough messages are analyzed, one or more potential intents are identified using the analysis from 401. For example, identified intents include a user requesting to book a restaurant reservation, change an address for an account, or submit an IT ticket, among others. In some embodiments, a determination is made that multiple potential intents are appropriate based on the current context of the chat conversation.

In various embodiments, the determined potential intents can also be based at least in part on the analysis of messages sent from the live agent. For example, in response to a chat user sharing that their laptop has a problem, a live agent can respond that there are two possible solutions: replacing the laptop with a new laptop or scheduling a service technician to look at the laptop. From the conversation, the two corresponding determined potential intents can include an intent to order a new laptop and an intent to schedule a repair.

At 405, entities are identified and populated from the messages. For example, based on the chat conversation, one or more entities or context variables can be identified and populated with values extracted from the chat conversation and its context. In some embodiments, the entities or context variables are used to initialize an automated workflow. For example, in response to a chat user sharing that their laptop has a problem, a target hardware type context variable can be set to "laptop." Similarly, in response to a chat user sharing that their cell phone has a problem, the same target hardware type context variable can be set to "mobile_phone." In various embodiments, the entities identified and populated are based on the potential intents determined at 403. For example, in the event an intent to order a new laptop is determined to be a potential intent, entity values corresponding to that intent will be populated if they are available from the context of the conversation.

At 407, automated workflows are provided based on the determined potential intents. For example, a list of automated workflows corresponding to the potential intents determined at 403 is provided to the live agent. In some embodiments, the list is prepared and only presented to the live agent in response to the live agent activating an automation or virtual agent trigger, such as a menu button or command. For example, a live agent can bring up a graphical user interface to display the current automated workflows that the chat agent platform has identified as relevant to the current conversation. In some embodiments, the list includes any workflows the live agent and/or chat user has access to in addition to the intents determined at 403. In some embodiments, the list of automated workflows is automatically presented to the live agent when the confidence level that the workflow is relevant exceeds a confidence threshold value. For example, a new automated workflow will be made available and shown to a live agent only when the level of confidence that the workflow would be beneficial exceeds a configured confidence threshold value.

In some embodiments, the live agent can display the list of automated workflows via the live agent's chat agent user interface. For example, a live agent can enter a command message into the chat message window that is interpreted as a command for the chat agent platform instead of as a message to the chat user. The command can display the appropriate automated workflows and allow the live agent to invoke a specified workflow from the list. In some embodiments, the command also allows the live agent to specify input or configuration parameters to initialize the selected workflow.

Figure 5:
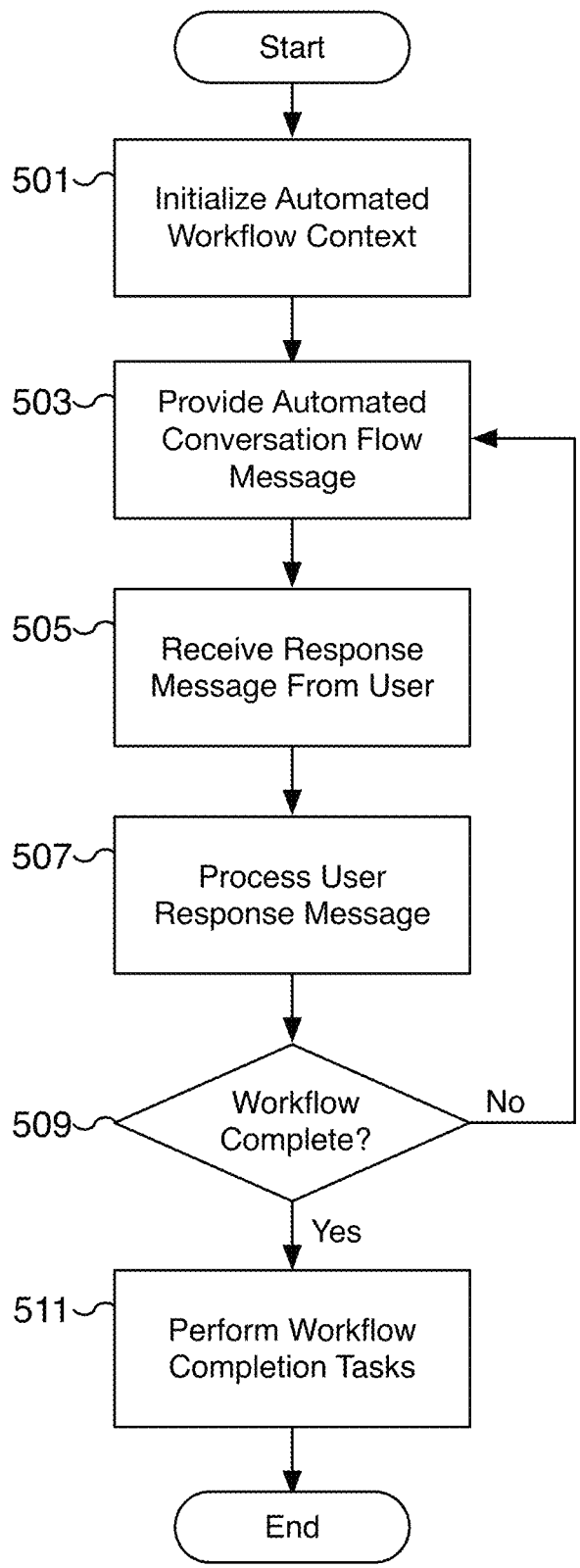
FIG. 5 is a flow chart illustrating an embodiment of a process for applying a specified automated agent interactive workflow during a chat session.

FIG. 5 is a flow chart illustrating an embodiment of a process for applying a specified automated agent interactive workflow during a chat session. The process of FIG. 5 can be performed in response to a live agent invoking a specified automated workflow to be performed by an automated agent, such as a virtual agent or chat bot. In various embodiments, the automated workflow involves a series of back-and-forth messages between the automated agent and the chat user in order to resolve an issue such as a chat user's request. In some embodiments, the process of FIG. 5 is performed at 305, 307, and/or 309 of FIG. 3 by a chat agent service such as a chat agent service running on chat application server 121 of FIG. 1. In some embodiments, the chat session associated with the process of FIG. 5 is a communication session between a live agent of live agent client 101 or 103 of FIG. 1 and a chat user of chat user client 105 or 107 of FIG. 1. In some embodiments, the relevant data of the chat agent service is stored in a database such as database 123 of FIG. 1.

At 501, the automated workflow context is initialized. For example, configuration and input parameters to the automated workflow are initialized. In some embodiments, the values are populated from values provided by the live agent and/or the context of the chat conversation. For example, a live agent can specify input parameters when invoking a specific automated workflow that are used to initialize the workflow context. The initialized context at 501 may allow the virtual agent to skip steps in the automated workflow. For example, in some embodiments, steps by the virtual agent to gather background information from the chat user can be skipped in the event the values are supplied during the initialization of the automated workflow.

At 503, an automated conversation flow message is provided. For example, the virtual agent creates and sends a message to the chat user by following a configured conversation flow. In some embodiments, the automated agent responds to direction provided by the live agent for directing the progress of the conversation flow. In some embodiments, the message provided by the virtual agent is created from a message template. The message template can reference values including values configured from the workflow context initialized at 501 and values extracted from previous responses to the virtual agent, among other data sources. For example, the message template can reference data extracted from a database such as a customer database or a configuration management database (CMDB).

In some embodiments, the message provided is a rich message and can include or invoke a rich message user interface element. For example, a request to provide a time for booking an appointment can invoke an appointment selection user interface element that allows the chat user to select a time and date using a graphical user interface instead of responding with a text only response. As another example, a rich message user interface element corresponding to a menu of available options can be provided to the chat user. The chat user can be required to select from the available options using the provided graphical user interface.

At 505, a response message is received from the chat user. For example, the chat user responds to the message provided at 503. In some embodiments, the response message is a text message response. In some embodiments, the response message is provided via a rich message user interface element such as an appointment selection user interface element or a menu element. For example, a response message is generated based on a chat user selecting one option from a list of available response options provided in a graphical user interface.

At 507, the user response message is processed. For example, the response received at 505 in response to the message provided at 503 is processed as part of the automated workflow. In various embodiments, the processing is based on the configured automated workflow and can include actionable tasks such as ordering a new hardware device, emailing an assignment to a service technician, and updating customer data in a customer database.

At 509, a determination is made whether the automated workflow is complete. In the event the workflow is not complete, processing loops back to 503 for the virtual agent to continue with the remaining steps of the automated workflow. In the event the workflow is complete, processing continues to 511.

At 511, completion tasks for the automated workflow are performed. For example, the required steps of the automated workflow have all been completed, and one or more completion tasks to finalize the workflow are now executed. The completion tasks can include logging actions such as logging a completion status and/or critical steps of the workflow to a customer database or transaction logging system. In some embodiments, the completion tasks include notifying the corresponding live agent that the automation agent has completed the automated workflow and/or the workflow has ended. For example, the live agent receives a notification that their attention is required for the chat session and that the chat user is waiting for the chat session to transition from the virtual agent back to the live agent. In various embodiments, one completion task includes transitioning the chat session back to the live agent including displaying messages to the chat user that the live agent is returning to the chat session.

Figure 6:
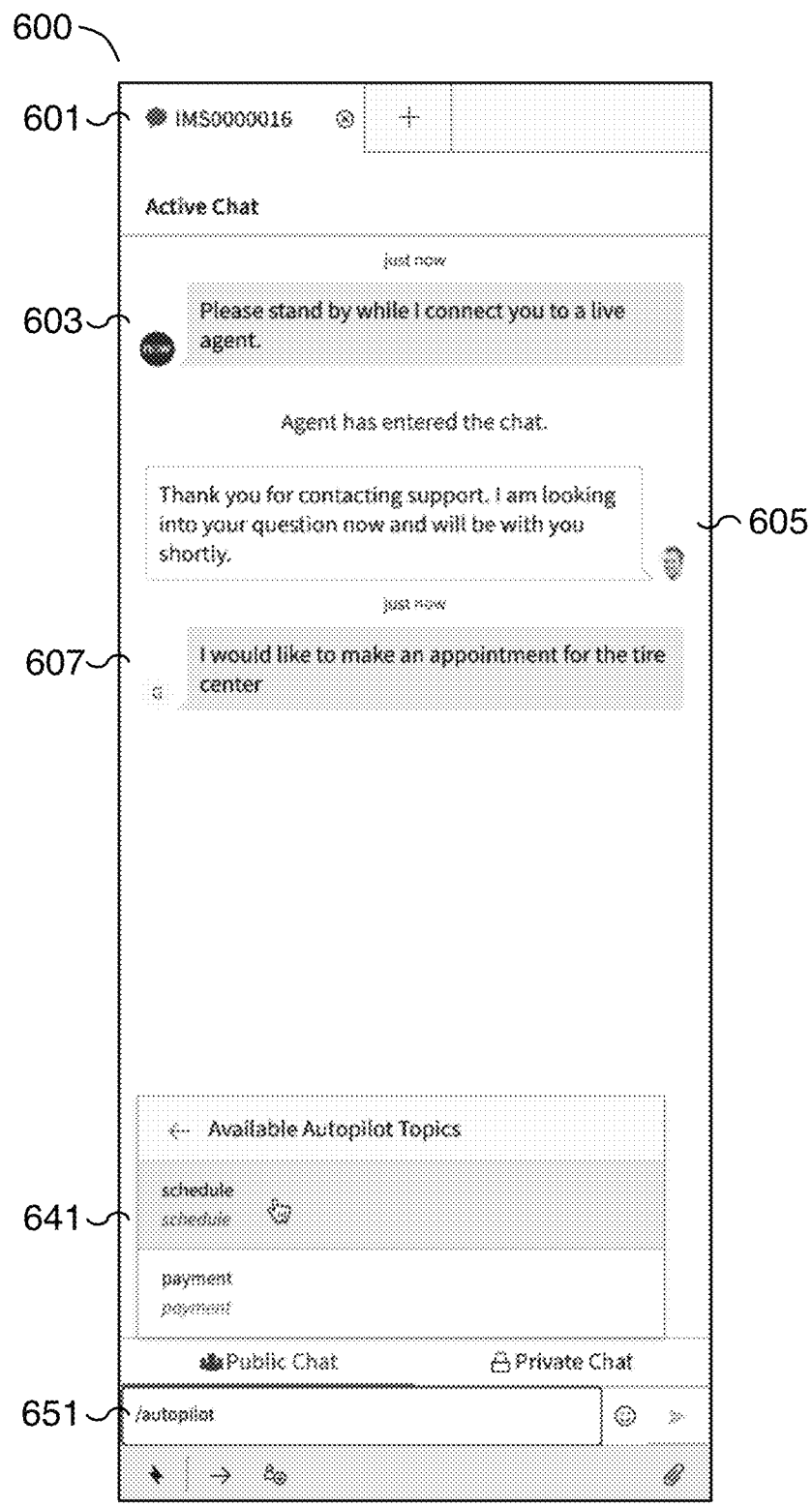
FIG. 6 is a diagram illustrating an embodiment of a chat agent user interface for invoking an automated agent to perform an automated workflow.

FIG. 6 is a diagram illustrating an embodiment of a chat agent user interface for invoking an automated agent to perform an automated workflow. In the example shown, user interface 600 is part of a chat agent platform used by a live agent for participating in a chat session with a chat user. Based on the context of the conversation, the live agent interacts with user interface 600 to invoke a specific automated workflow that is carried out by an automated agent. Key elements of user interface 600 include chat identifier 601, chat messages 603, 605, and 607, available automated workflows menu 641, and chat message field 651. In the example shown, the automated workflows available to the live agent are shown in available automated workflows menu 641 and are described as Autopilot Topics. The live agent is able to display the available automated workflows in available automated workflows menu 641 by issuing an autopilot command (e.g., "/autopilot") in chat message field 651. In some embodiments, user interface 600 is displayed during a chat session to a live agent such as the live agent of live agent client 101 or 103 of FIG. 1. In some embodiments, user interface 600 is shown at step 207 of FIG. 2, 303 of FIG. 3, and/or 407 of FIG. 4 and is implemented at least in part by a chat agent service such as a chat agent service running on chat application server 121 of FIG. 1. In some embodiments, the relevant data of the chat session is stored in a database such as database 123 of FIG. 1.

In the example shown, chat identifier 601 is used to display an identifier assigned to the chat session. In some embodiments, chat identifier 601 is displayed in a tab (as shown in FIG. 6) and multiple tabs (not shown) corresponding to different chat sessions are available to the live agent. Below chat identifier 601 is a chat window with chat messages including chat messages 603, 605, and 607. Chat message 603 displays an automated welcome message generated by the chat agent platform to request that the chat user wait while the chat agent platform connects the chat user to a live agent. Chat message 605 is a chat message sent from the live agent once the live agent has entered the chat session. Chat message 607 is the chat user's response to chat message 605. In chat message 607, the chat user describes that they would like to make an appointment for a tire center. At this point, the live agent enters the autopilot command (e.g., "/autopilot") in chat message field 651 to display the available automated workflows in available automated workflows menu 641. For example, based on the chat user's last message shown in chat message 607, the live agent would like to invoke an automated workflow to schedule an appointment for the chat user. Using user interface 600, the live agent can select one of the two available workflows, a "schedule" workflow or a "payment" workflow. In the example shown, the automated workflows are described as Autopilot Topics. In some embodiments, the two workflows are included based on the context of the chat conversation. In the example shown, the "schedule" workflow is highlighted and corresponds to a workflow for scheduling an appointment. In the event the live agent selects a workflow from available automated workflows menu 641, the name of the selected workflow is appended to the "/autopilot" command in chat message field 651. For example, in the event the live agent selects the "schedule" workflow from available automated workflows menu 641, the contents of chat message field 651 can be replaced with the command line "/autopilot 'schedule'". In some embodiments, the live agent can further append additional arguments to the command shown in chat message field 651 to direct the initialization of the specified workflow.

Figure 7:
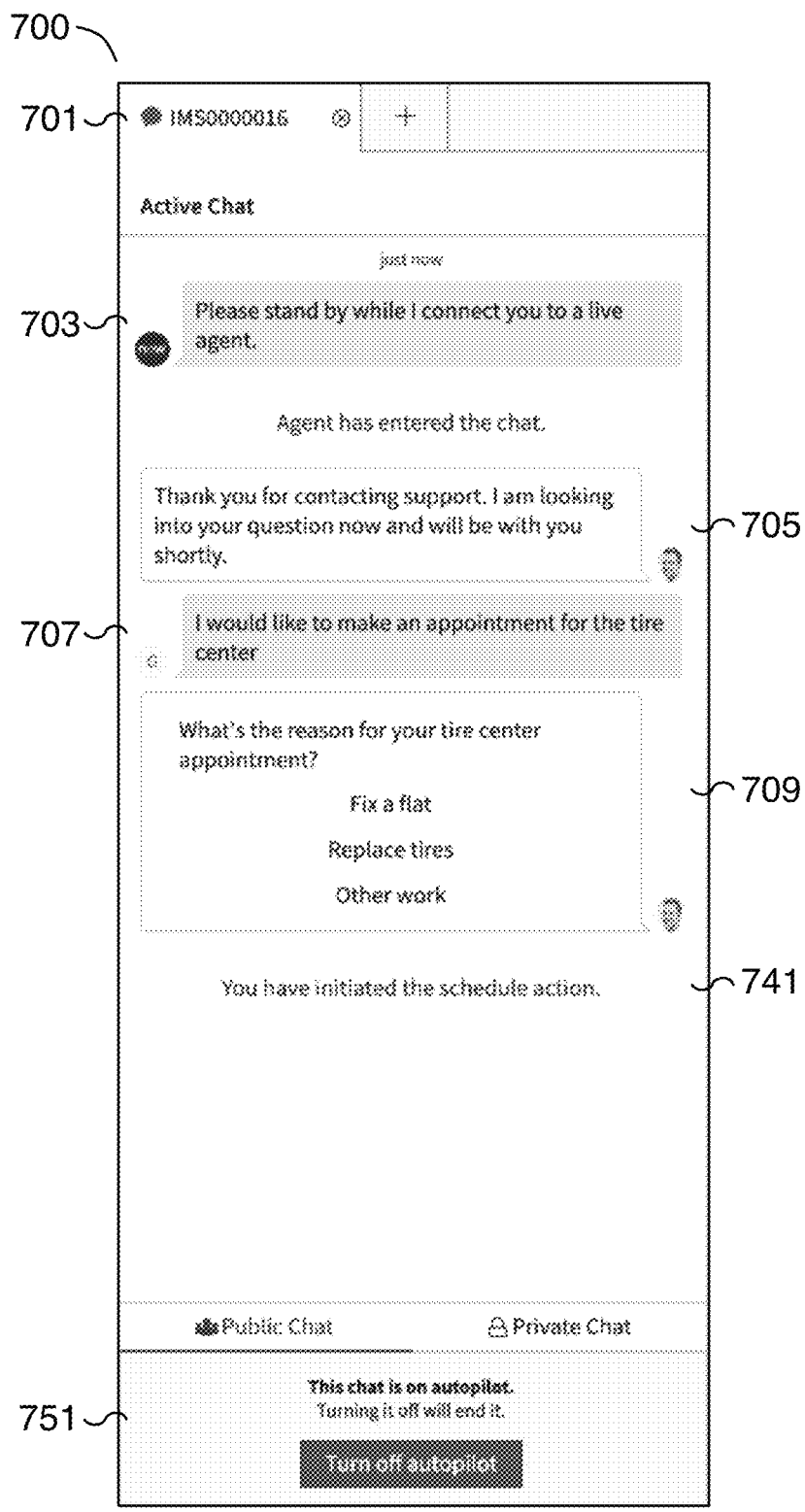
FIG. 7 is a diagram illustrating an embodiment of a chat agent user interface once an automated agent is invoked to perform an automated workflow.

FIG. 7 is a diagram illustrating an embodiment of a chat agent user interface once an automated agent is invoked to perform an automated workflow. In the example shown, user interface 700 is part of a chat agent platform used by a live agent. User interface 700 is displayed to the live agent after the "schedule" automated workflow shown in available automated workflows menu 641 of FIG. 6 is invoked by the live agent via user interface 600 of FIG. 6. User interface 700 shows the chat agent software after the automated agent has begun interacting with the chat user. Key elements of user interface 700 include chat identifier 701, chat messages 703, 705, 707, and 709, automated agent message 741, and chat automated agent field 751. In some embodiments, user interface 700 is shown at step 207 of FIG. 2, after step 307 of FIG. 3, and/or at step 503 of FIG. 5 and is implemented at least in part by a chat agent service such as a chat agent service running on chat application server 121 of FIG. 1. In some embodiments, the relevant data of the chat session is stored in a database such as database 123 of FIG. 1.

In the example shown, chat identifier 701 corresponds to chat identifier 601 of FIG. 6, chat messages 703, 705, and 707 correspond to chat messages 603, 605, and 607 of FIG. 6, respectively, and chat automated agent field 751 replaces chat message field 651 of FIG. 6. Newly included chat message 709 is created and sent by the invoked automated agent to the chat user. Chat message 709 is a rich chat message and displays a menu of available options to the chat user. For example, underneath the message "What's the reason for your tire center appointment?," chat message 709 displays the menu options "Fix a flat," "Replace tires," and "Other work." Since user interface 700 is the live agent's user interface, the actual rich chat message seen by the chat user can be different and can, for example, allow the chat user to select an option from the menu. Beneath chat message 709 is displayed automated agent message 741. Automated agent message 741 is a notification message to the live agent and informs the live agent that the "schedule" workflow has been initiated. In addition to automated agent message 741, chat automated agent field 751 also notifies the live agent that an automated agent is actively engaged in an interactive workflow. Chat automated agent field 751 further allows the live agent to cancel the invoked automated workflow by selecting the "Turn off autopilot" button.

Figure 8:
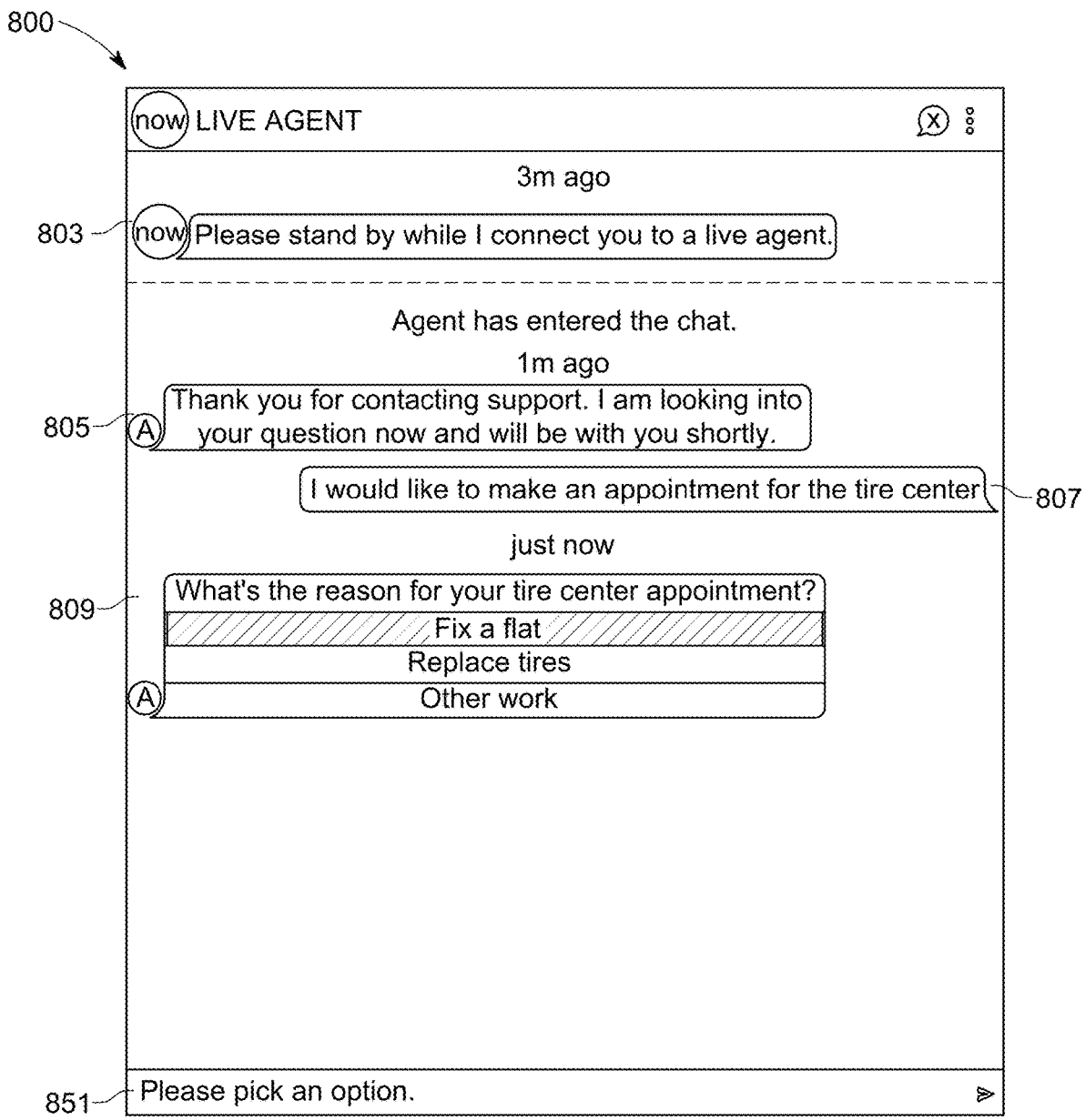
FIG. 8 is a diagram illustrating an embodiment of a chat agent user interface for a chat user interacting with an automated agent.

FIG. 8 is a diagram illustrating an embodiment of a chat agent user interface for a chat user interacting with an automated agent. In the example shown, user interface 800 is part of a chat agent platform used by a chat user. User interface 800 is displayed to the chat user after the "schedule" automated workflow shown in available automated workflows menu 641 of FIG. 6 is invoked by the live agent via user interface 600 of FIG. 6. User interface 800 shows the chat agent software after the automated agent has begun interacting with the chat user and is the chat user view of user interface 700 of FIG. 7. Key elements of user interface 800 include chat messages 803, 805, 807, and 809, and chat message field 851. In some embodiments, user interface 800 is displayed to a chat user during a chat session originally started with a live agent but now with an automated agent performing an automated workflow. In some embodiments, the chat user is the chat user of chat client 105 or 107 of FIG. 1. In some embodiments, user interface 800 is shown at step 207 of FIG. 2, after step 307 of FIG. 3, and/or at step 503 of FIG. 5 and is implemented at least in part by a chat agent service such as a chat agent service running on chat application server 121 of FIG. 1. In some embodiments, the relevant data of the chat session is stored in a database such as database 123 of FIG. 1.

In the example shown, chat messages 803, 805, and 807 correspond to chat messages 603, 605, and 607 of FIG. 6, respectively, and also to chat messages 703, 705, and 707 of FIG. 7, respectively. Chat message 809 corresponds to chat message 709 of FIG. 7. In the example shown, chat messages 803, 805, 807, and 809 are chat messages shown from the perspective of the chat user instead of the live agent. Chat message 809 is a rich chat message and allows the user to select from one of the displayed options ("Fix a flat," "Replace tires," or "Other work"). Chat message 809 shows the option "Fix a flat" highlighted. Chat message field 851 is shown with the text "Please pick an option." to help direct the chat user to interact with chat message 809 instead of typing a text message. In various embodiments, when a chat user is expected to interact with a chat message, chat message field 851 displays instructions for the user instead of a text field for entering a text message.

Figure 9:
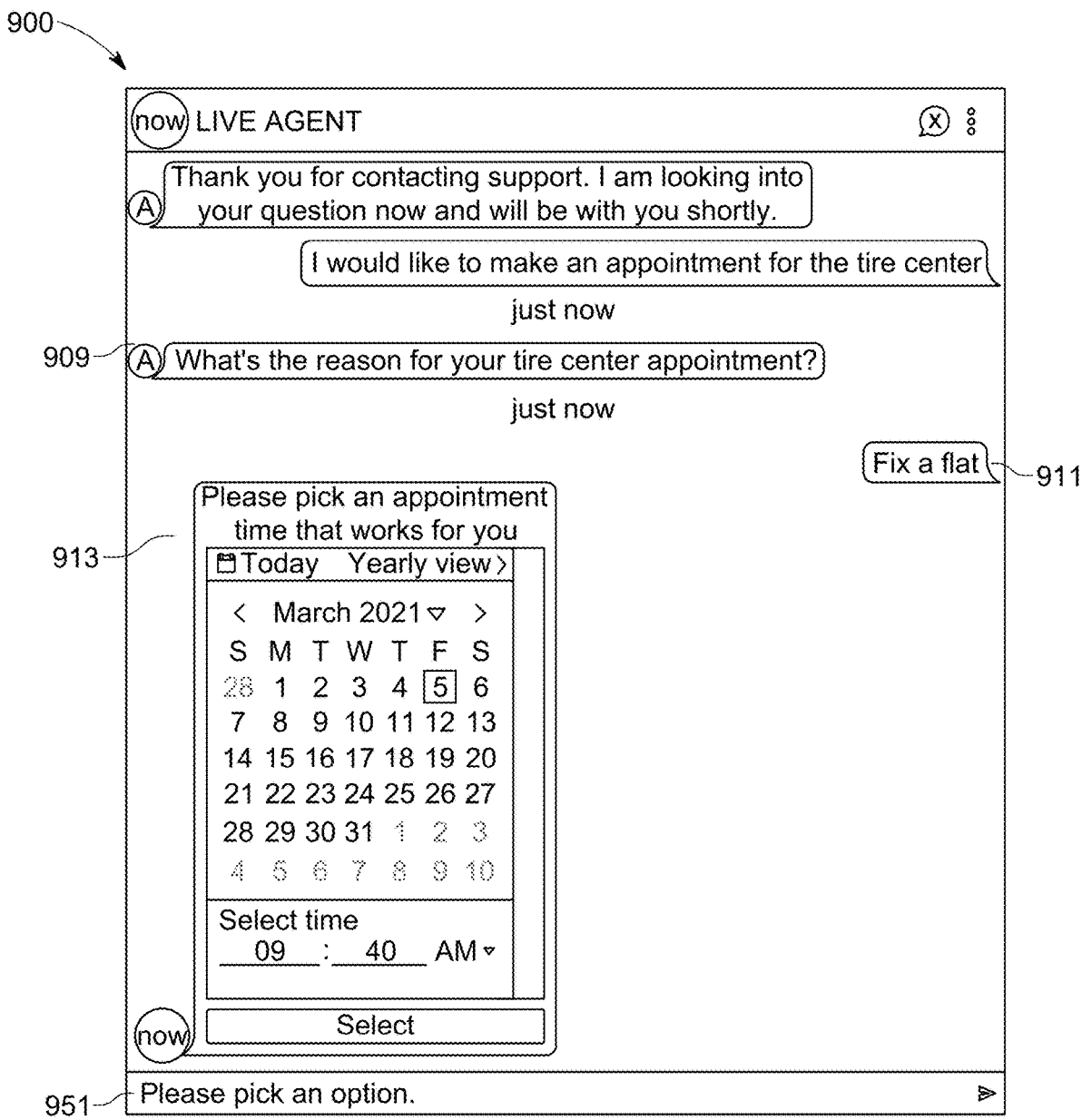
FIG. 9 is a diagram illustrating an embodiment of a chat agent user interface for a chat user interacting with an automated agent.

FIG. 9 is a diagram illustrating an embodiment of a chat agent user interface for a chat user interacting with an automated agent. In the example shown, user interface 900 is part of a chat agent platform used by a chat user. User interface 900 is displayed to the chat user during the execution of the "schedule" automated workflow shown in available automated workflows menu 641 of FIG. 6 and corresponds to the progression of the chat session of user interface 800. User interface 900 shows the chat agent software after the chat user has responded to chat message 709 of FIG. 7 and corresponding chat message 809 of FIG. 8. User interface 900 also shows the automated agent proceeding to a following step of the automated workflow. Key elements of user interface 900 include chat messages 909, 911 and 913, and chat message field 951. In some embodiments, user interface 900 is shown at step 207 of FIG. 2, after step 307 of FIG. 3, and/or at step 503 of FIG. 5 and is implemented at least in part by a chat agent service such as a chat agent service running on chat application server 121 of FIG. 1. In some embodiments, the relevant data of the chat session is stored in a database such as database 123 of FIG. 1.

In the example shown, chat message 909 corresponds to chat message 809 of FIG. 8 and corresponding message 709 of FIG. 7 after a reason for the appointment has been selected by the chat user. Since a selection has been made, chat message 909 no longer displays the available options. Instead, chat message 911 is generated on behalf of the chat user with the selected message "Fix a flat." In some embodiments, the message of chat message 911 is automatically generated and chat message 911 is automatically sent on behalf of the chat user. In response to chat message 911, the chat user receives chat message 913 from the automated agent. Chat message 913 is a rich message and includes the message "Please pick an appointment time that works for you" and an appointment selection user interface element. Using the appointment selection user interface element of chat message 913, the chat user can select a date and time for the appointment. In the example shown, chat message 913 shows a Select button to indicate that the chat user has not yet selected and should proceed by selecting an appointment date. Once a date is selected, the appointment selection user interface element of chat message 913 will no longer be required as in user interface 1000 of FIG. 10. Chat message field 951, similar to chat message field 851 of FIG. 8, directs the chat user to interact with the last received message (i.e., chat message 913) with the instructions "Please pick an option."

Figure 10:
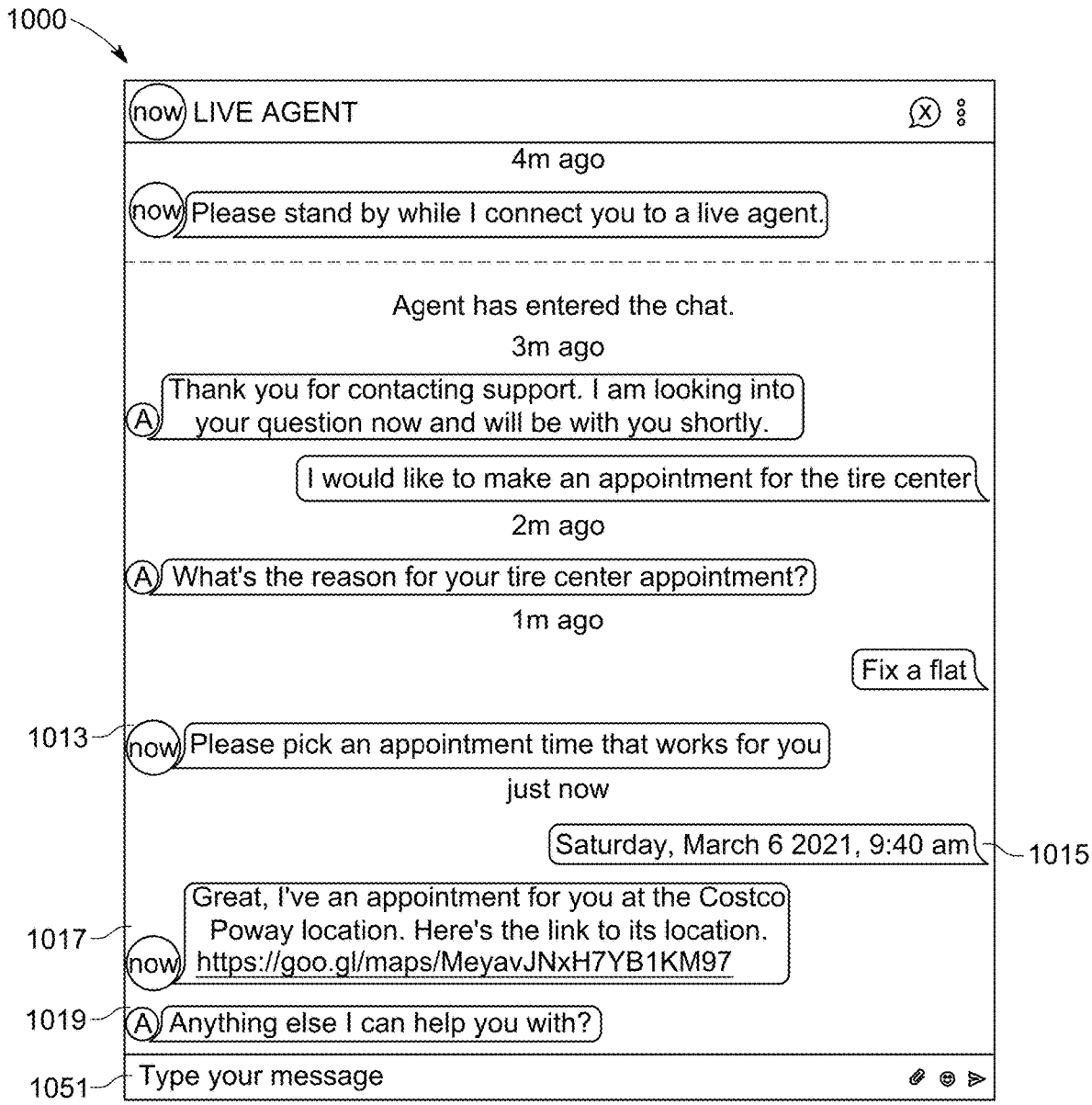
FIG. 10 is a diagram illustrating an embodiment of a chat agent user interface for a chat user interacting with an automated agent.

FIG. 10 is a diagram illustrating an embodiment of a chat agent user interface for a chat user interacting with an automated agent. In the example shown, user interface 1000 is part of a chat agent platform used by a chat user. User interface 1000 is displayed to the chat user during the execution of the "schedule" automated workflow shown in available automated workflows menu 641 of FIG. 6 and corresponds to the progression of the chat session of user interface 900. User interface 1000 shows the chat agent software after the chat user has responded to chat message 913 of FIG. 9. User interface 1000 also shows the automated agent proceeding to a following step of the automated workflow. Key elements of user interface 1000 include chat messages 1013, 1015, 1017, and 1019, and chat message field 1051. In some embodiments, user interface 1000 is shown at step 207 of FIG. 2, after step 307 of FIG. 3, and/or at step 503 of FIG. 5 and is implemented at least in part by a chat agent service such as a chat agent service running on chat application server 121 of FIG. 1. In some embodiments, the relevant data of the chat session is stored in a database such as database 123 of FIG. 1.

In the example shown, chat message 1013 corresponds to chat message 913 of FIG. 9 after a date and time for an appointment has been selected by the chat user. Since a selection has been made, chat message 1013 no longer includes an appointment selection user interface element. Instead, the appointment selection user interface element is replaced with chat message 1015. In some embodiments, the message of chat message 1015 is automatically generated and sent on behalf of the chat user in response to the chat user make a selection from chat message 1013. Chat message 1015 is sent from the chat user and is generated to include the selected time and date of the appointment. As shown in the example, chat message 1015 includes the message "Saturday, Match 6 2021, 9:40 am." The date of chat message 1015 is different from the tentative and unconfirmed date shown in the appointment selection user interface element of chat message 913 from user interface 900 of FIG. 9 since the chat user has now selected a date based on the chat user's preference.

In response to chat message 1015, the automated agent responds with chat messages 1017 and 1019. Chat message 1017 is a confirmation of the scheduled appointment and includes a confirmation message and a link to a map of the appointment location. Chat message 1019 is a follow up message from the automated agent to ask the chat user if there is anything else that the automated (or live) agent can help with. In some embodiments, chat message 1019 corresponds to the action performed by the automated agent to make an appointment at the specified time. The action may include accessing third-party services and/or other cloud-based services for performing the requested function.

Figure 11:
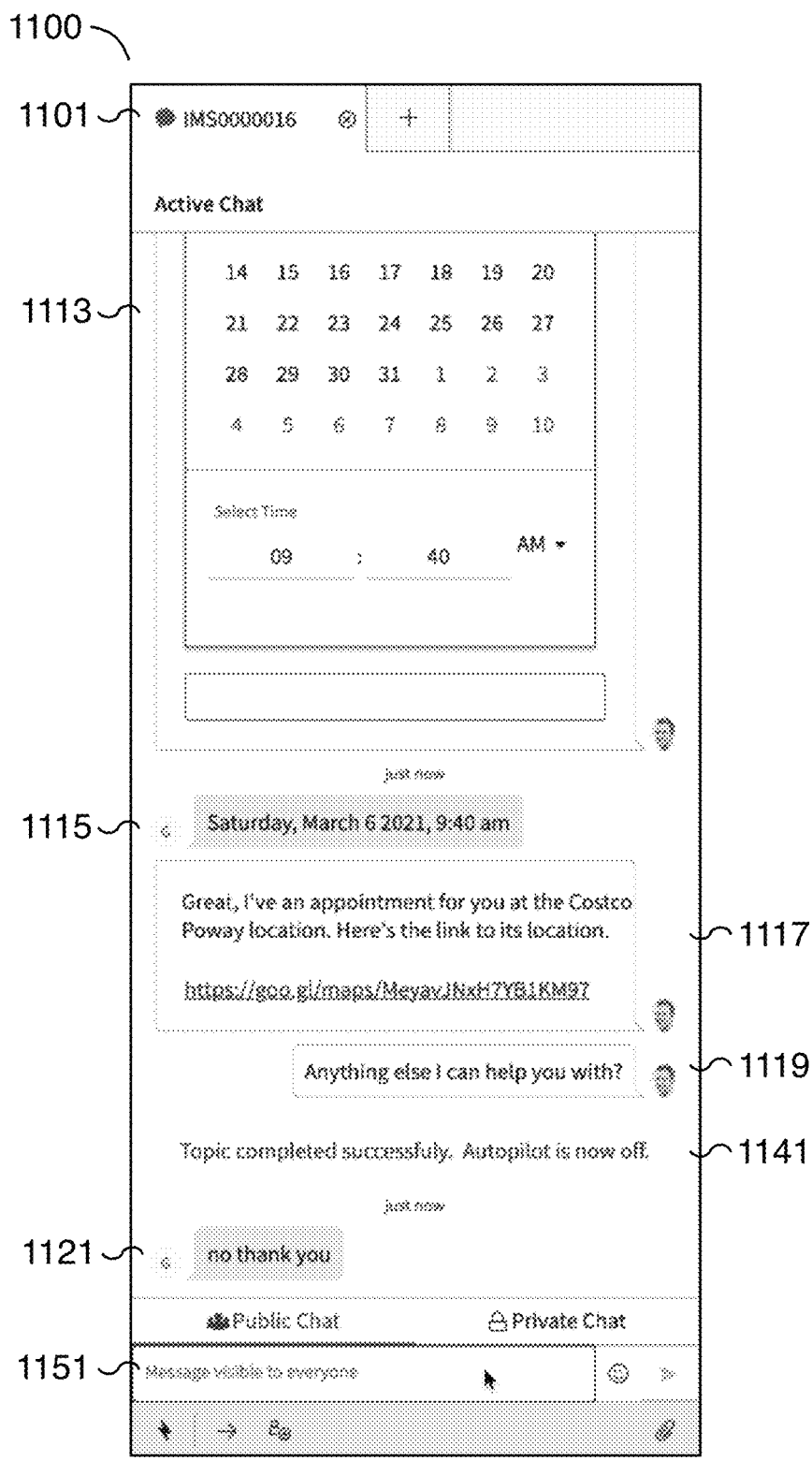
FIG. 11 is a diagram illustrating an embodiment of a chat agent user interface after an automated agent has completed an automated workflow.

FIG. 11 is a diagram illustrating an embodiment of a chat agent user interface after an automated agent has completed an automated workflow. In the example shown, user interface 1100 is part of a chat agent platform used by a live agent. User interface 1100 is displayed to the live agent after the "schedule" automated workflow shown active in user interface 700 of FIG. 7 completes. User interface 1100 shows the transition of the chat session back to the live agent from the automated agent. Key elements of user interface 1100 include chat identifier 1101, chat messages 1113, 1115, 1117, 1119, and 1121, automated agent message 1141, and chat message field 1151. In some embodiments, user interface 1100 is shown after step 207 of FIG. 2, after step 309 of FIG. 3, and/or after the process of FIG. 5 has performed an automated workflow. In some embodiments, user interface 1100 is implemented at least in part by a chat agent service such as a chat agent service running on chat application server 121 of FIG. 1. In some embodiments, the relevant data of the chat session is stored in a database such as database 123 of FIG. 1.

In the example shown, chat identifier 1101 corresponds to chat identifier 601 of FIG. 6 and chat identifier 701 of FIG. 7, chat message 1113 corresponds to chat message 913 of FIG. 9 and chat message 1013 of FIG. 10, chat messages 1115, 1117, and 1119 correspond to chat messages 1015, 1017, and 1019 of FIG. 10, respectively, and chat message field 1151 corresponds to chat message field 651 of FIG. 6 while also replacing chat automated agent field 751 of FIG. 7. Newly included chat message 1121 is created and sent by the chat user in response to chat message 1119. Automated agent message 1141 indicates to the live agent that the automated workflow has completed successfully and that the automate agent is no longer active. Once the automated agent is no longer active, chat message field 1151 replaces chat automated agent field 751 of FIG. 7 and allows the live agent to once again send messages directly to the chat user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication from a live agent in a communication session with a user to invoke a specified automated agent interactive conversation flow, wherein the specified automated agent interactive conversation flow is invoked by the live agent for the user in response to a determination of the live agent that, among available automated agent interactive conversation flows selectable by the live agent, the specified automated agent interactive conversation flow will address a request of the user;
transitioning the communication session with the user from the live agent to the specified automated agent interactive conversation flow, wherein the live agent retains control over the communication session during the specified automated agent interactive conversation flow;
providing an indication of an interaction of the user with the specified automated agent interactive conversation flow; and
returning the communication session with the user from the specified automated agent interactive conversation flow back to the live agent that retained control over the communication session during the specified automated agent interactive conversation flow.

2. The method of claim 1, wherein the indication from the live agent in the communication session with the user to invoke the specified automated agent interactive conversation flow includes parameters for initializing the specified automated agent interactive conversation flow.

3. The method of claim 2, wherein the parameters are automatically extracted from messages from the communication session with the user.

4. The method of claim 1, further comprising:
receiving from the live agent an input for directing progress of the specified automated agent interactive conversation flow.

5. The method of claim 1, further comprising:
providing a list of available automated workflows to the live agent; and
receiving a selected automated workflow from the list of available automated workflows, wherein the selected automated workflow directs the specified automated agent interactive conversation flow.

6. The method of claim 5, further comprising:
determining the list of available automated workflows based on a content of messages from the communication session with the user.

7. The method of claim 1, wherein the indication of the interaction of the user with the specified automated agent interactive conversation flow masks sensitive information provided by the user from the live agent.

8. The method of claim 1, wherein a message sent during the specified automated agent interactive conversation flow includes a rich message, and wherein the rich message provides the user with one or more options for selecting a response.

9. The method of claim 8, wherein the rich message includes a graphical user interface element for selecting a response from the one or more options.

10. The method of claim 8, further comprising automatically generating a responsive message on behalf of the user based on a selection to the rich message.

11. A system, comprising:
one or more processors; and
a memory coupled to the one or more processors, wherein the memory is configured to provide the one or more processors with instructions which when executed cause the one or more processors to:
receive an indication from a live agent in a communication session with a user to invoke a specified automated agent interactive conversation flow, wherein the specified automated agent interactive conversation flow is invoked by the live agent for the user in response to a determination of the live agent that, among available automated agent interactive conversation flows selectable by the live agent, the specified automated agent interactive conversation flow will address a request of the user;
transition the communication session with the user from the live agent to the specified automated agent interactive conversation flow, wherein the live agent retains control over the communication session during the specified automated agent interactive conversation flow;
provide an indication of an interaction of the user with the specified automated agent interactive conversation flow; and
return the communication session with the user from the specified automated agent interactive conversation flow back to the live agent that retained control over the communication session during the specified automated agent interactive conversation flow.

12. The system of claim 11, wherein the indication from the live agent in the communication session with the user to invoke the specified automated agent interactive conversation flow includes parameters for initializing the specified automated agent interactive conversation flow.

13. The system of claim 12, wherein the parameters are automatically extracted from messages from the communication session with the user.

14. The system of claim 11, wherein the memory is further configured to provide the one or more processors with instructions which when executed cause the one or more processors to:
receive input from the live agent for directing progress of the specified automated agent interactive conversation flow.

15. The system of claim 11, wherein the memory is further configured to provide the one or more processors with instructions which when executed cause the one or more processors to:
provide a list of available automated workflows to the live agent; and
receive a selected automated workflow from the list of available automated workflows, wherein the selected automated workflow directs the specified automated agent interactive conversation flow.

16. The system of claim 15, wherein the memory is further configured to provide the one or more processors with instructions which when executed cause the one or more processors to determine the list of available automated workflows based on a content of messages from the communication session with the user.

17. The system of claim 11, wherein the indication of the interaction of the user with the specified automated agent interactive conversation flow masks sensitive information provided by the user from the live agent.

18. The system of claim 11, wherein a message sent during the specified automated agent interactive conversation flow includes a rich message, and wherein the rich message provides the user with one or more options for selecting a response, and wherein the rich message includes a graphical user interface element for selecting a response from the one or more options.

19. The system of claim 18, wherein the memory is further configured to provide the one or more processors with instructions which when executed cause the one or more processors to automatically generate a responsive message on behalf of the user based on a selection to the rich message.

20. A computer program product, the computer program product being embodied in a non-transitory computer readable storage medium and comprising computer instructions for:
receiving an indication from a live agent in a communication session with a user to invoke a specified automated agent interactive conversation flow, wherein the specified automated agent interactive conversation flow is invoked by the live agent for the user in response to a determination of the live agent that, among available automated agent interactive conversation flows selectable by the live agent, the specified automated agent interactive conversation flow will address a request of the user;
transitioning the communication session with the user from the live agent to the specified automated agent interactive conversation flow, wherein the live agent retains control over the communication session during the specified automated agent interactive conversation flow;
providing an indication of an interaction of the user with the specified automated agent interactive conversation flow; and
returning the communication session with the user from the specified automated agent interactive conversation flow back to the live agent that retained control over the communication session during the specified automated agent interactive conversation flow.

* * * * *